April 6, 1954  R. H. BOJEWICZ ET AL  2,674,033
APPARATUS FOR ASSEMBLING COMMUTATORS
Filed March 1, 1952  7 Sheets-Sheet 1

INVENTORS.
CHARLES RAYMOND FISH
AND ROBERT HENRY BOJEWICZ,
BY
Allen + Allen
ATTORNEYS.

April 6, 1954  R. H. BOJEWICZ ET AL  2,674,033
APPARATUS FOR ASSEMBLING COMMUTATORS
Filed March 1, 1952  7 Sheets-Sheet 2

INVENTORS.
CHARLES RAYMOND FISH
AND ROBERT HENRY BOJEWICZ,
BY
Allen & Allen
ATTORNEYS.

R. H. BOJEWICZ ET AL 2,674,033

APPARATUS FOR ASSEMBLING COMMUTATORS

Filed March 1, 1952

INVENTORS.
CHARLES RAYMOND FISH
AND ROBERT HENRY BOJEWICZ,
BY
Allen & Allen
ATTORNEYS.

April 6, 1954   R. H. BOJEWICZ ET AL   2,674,033
APPARATUS FOR ASSEMBLING COMMUTATORS
Filed March 1, 1952   7 Sheets-Sheet 5

INVENTORS.
CHARLES RAYMOND FISH
AND ROBERT HENRY BOJEWICZ,
BY
Allen & Allen
ATTORNEYS.

FIG. 21.

Patented Apr. 6, 1954

2,674,033

UNITED STATES PATENT OFFICE 2,674,033

APPARATUS FOR ASSEMBLING COMMUTATORS

Robert Henry Bojewicz and Charles Raymond Fish, Dayton, Ohio, assignors, by mesne assignments, to Reconstruction Finance Corporation, Cleveland, Ohio, a corporation of the United States Application March 1, 1952, Serial No. 274,356

13 Claims. (Cl. 29—205)

This invention is directed to various interrelated improvements in apparatus and machinery for assembling commutators.

The mechanisms herein disclosed and claimed are improvements based on the general teachings of the Weber Patent 2,394,955 and the application of Kroener, Serial No. 592,467, now Patent No. 2,585,792, issued February 12, 1952. The patent and application referred to are assigned to the same assignee as the instant invention.

The commutators with which the apparatus for this invention is concerned are of the type wherein a plurality of copper segments and mica strips are assembled together in alternate fashion, the assembly of segments or bars and mica strips, comprising an unbroken ring. In some such assemblies, every other member will be a mica strip while in other assemblies it may be that only every third or fourth member will be a mica strip. The various commutators may vary not only with respect to the numerical relation existing between the copper bars and the mica strips, but also such commutators will vary according to the size segment employed.

In general, that type of commutator with which this invention is concerned is comprised of a ring of the above mentioned copper bars and mica strips, a suitable sleeve extending through the center of this ring, said sleeve having a flange or collar on one end thereof, and a separate flange or collar which is adapted to be placed about the other end of the said sleeve, said other end of the sleeve then being swaged about the said last mentioned collar whereby the assembly of copper bars and mica segments is disposed about said sleeve and between said collars.

The instant invention is concerned with the means employed to assemble the copper bars and mica strips in ring form; the invention is not concerned with the means by which the assembly of bars and strips is later fixed in permanent position and relation to the above mentioned sleeves and collars.

In general it has heretofore been the practice, in assembling commutator segments in ring form, to position the copper and mica segments within the confines of a ring-shaped retaining member adapted to be clamped about a completed assembly of bars and strips. The ring-shaped retaining member is removably fixed within a suitable holder. After clamping, this member is removed from the holder with the assembly of bars and strips and taken to another operating station for completion of the commutator by insertion of the above mentioned collars and sleeve.

In order to position the copper bars and mica strips within the ring-shaped retaining member, it has heretofore been the practice to employ a pair of indexing heads between which the segments are placed and by which they are moved around in step-by-step sequence within the said ring-shaped member until an annulus of the said segments has been formed.

In addition to the above, it has also heretofore been the practice to employ some sort of pusher as the means for feeding the various segments between the indexing heads. The said heads are located one on either side of the initially open, ring-shaped member and so arranged that when the said pusher has positioned the segments between them, said segments will lie within the said ring. Upon completion of the assembly and clamping of the ring, the indexing heads may be withdrawn for said assembly will then be maintained by the clamped ring.

It is the object of the present invention to improve the general type of structure formerly employed in assembling commutators of the type above described. To this end, it is a specific object of this invention to improve the ring-shaped retaining element within which the commutator segments are initially assembled.

It is also an object of this invention to improve the indexing heads between which the commutator segments are positioned while the assembly is being formed.

A further object of this invention is to present much improved means for positioning the various commutator segments between the indexing heads employed. In this connection, it is a specific object to devise a pusher means by which it is possible to locate a mica strip between each pair of commutator bars or, when desired, to properly position relatively fewer of these mica strips between the indexing heads so that between each pair of mica strips there may be as many as two or three copper bars as desired. In this connection, it is also an object of this invention to provide a pusher member which can be easily and speedily changed to accommodate bars and strips of different size.

A very important object of this invention is to provide novel guide and packing means for aiding in the proper location of the commutator segments between the indexing heads as driven by the said pusher.

A further important object of this invention is to so modify and improve the various means and mechanisms employed to assemble commutators of the type herein described that such mechanism and means can be so associated as to provide controlled, automatic assembling operation. In this connection, it is a specific object of this invention to provide for the elimination of a great part of the tedious hand work necessitated in all apparatus for this general purpose heretofore known. Further objects and advantages inherent in this invention, will become apparent to those skilled in the art from the following description and from reference to the accompanying drawings wherein like numerals are employed to designate like parts throughout the same, and wherein:

The commutator

Figures 3, 4, 4A, 4B:
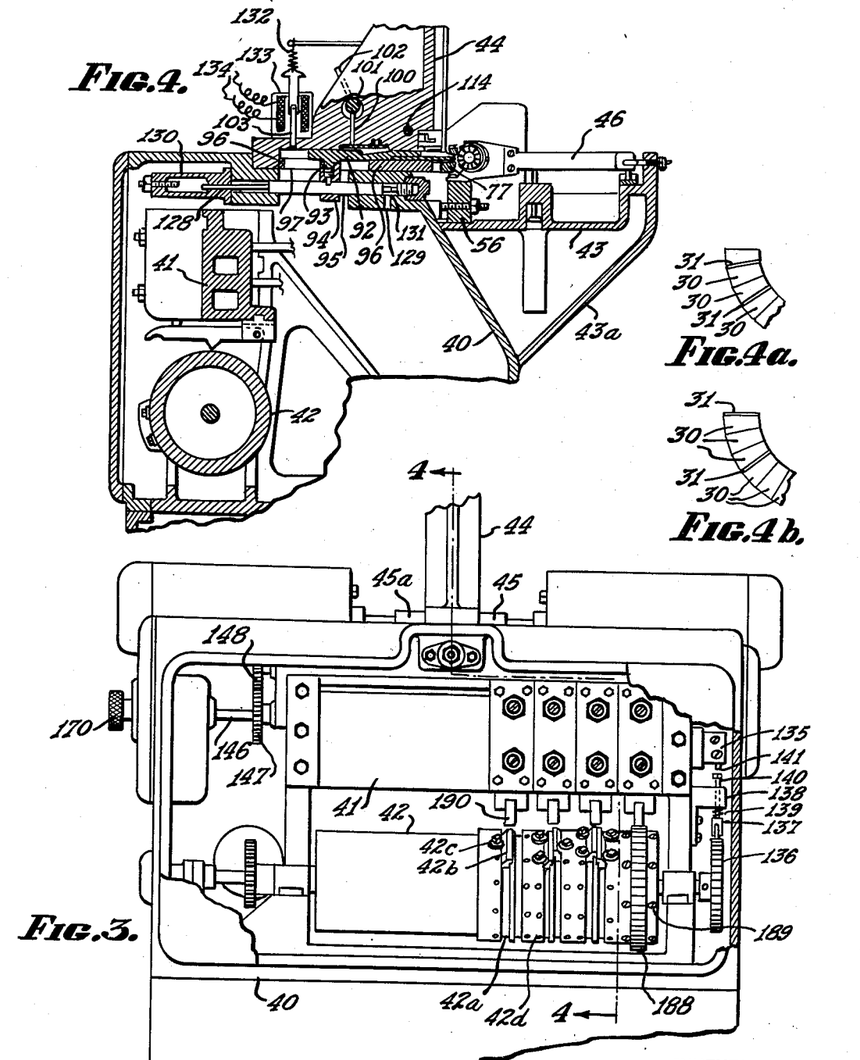
Figure 3 is a rear elevational view with parts broken away.
Figure 4 is a sectional view taken on the line 4—4 of Figure 3.
Figure 4a is a fragmentary perspective view of a commutator assembly in which there are two copper bars located between each pair of mica strips.
Figure 4b is a fragmentary, perspective view of a commutator assembly wherein three copper bars are located between each pair of mica strips.
Figures 12, 13, 14, 15:
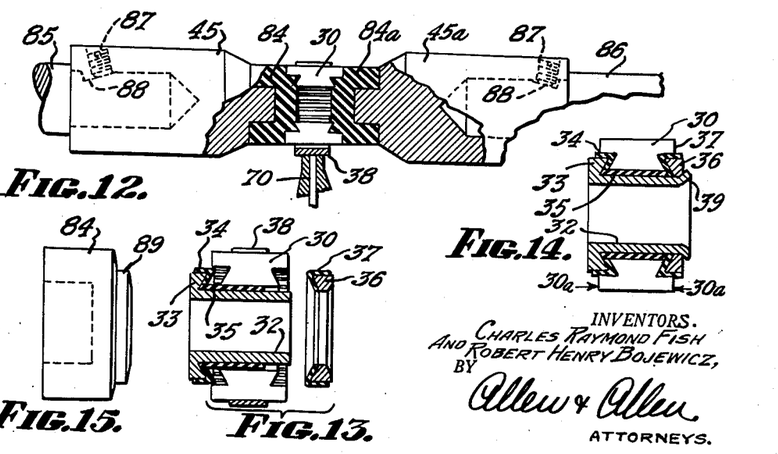
Figure 12 is an enlarged view of the work or indexing heads with parts broken away and parts in section.
Figure 13 is an exploded view of a ring of commutator bars and strips, a collared sleeve for use therewith, and a separate collar adapted to be placed about said sleeve after same has been placed within the ring of copper bars and mica strips.
Figure 14 shows a completed commutator, the sleeves and collars having been assembled with the commutator segments and the retaining ring having been removed.
Figure 15 is a side elevation of one of the work or indexing heads disclosed in Figure 12.
Figures 17, 18, 19, 20:
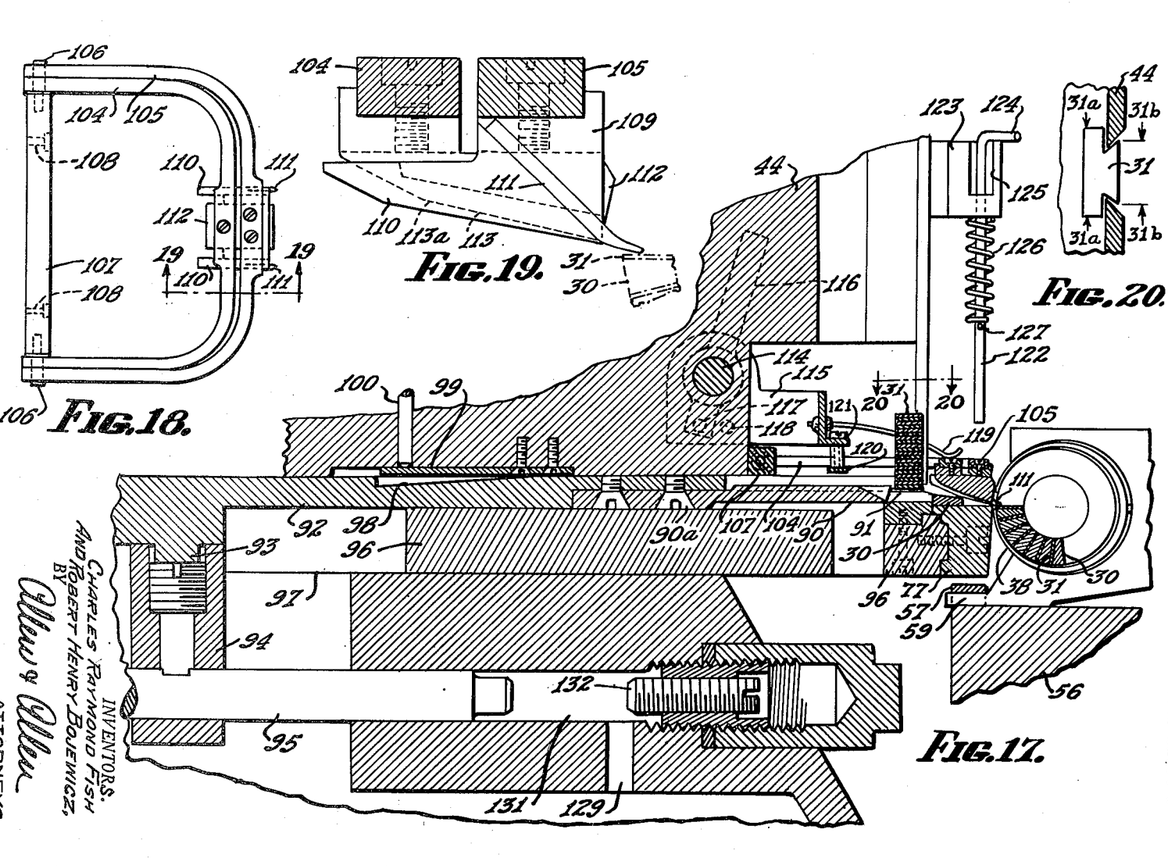
Figure 17 is an enlarged fragmentary, sectional view of a portion of the machinery shown in Figure 4, said view showing details of the ejection mechanism, the pusher being shown in its fully retracted position.
Figure 18 is a plan view of the guide and associated means for packing the commutator segments within the retaining ring between the indexing heads.
Figure 19 is a sectional view taken on the line 19—19 of Figure 18.
Figure 20 is a sectional view taken on the line 20—20 of Figure 17.

The machine and apparatus of the present invention is best suited for assembling commutators of the type shown in Figures 13 and 14. Such a commutator is comprised of an annulus or ring of copper bars and mica segments 30 and 31, respectively. A partially assembled ring of commutator segments is shown in Figure 17; in this figure it will be observed that the particular type of commutator assembly there being formed is one wherein the copper bars and mica strips are alternately arranged. In Figures 4a and 4b, there are shown other possible arrangements of the copper bars and mica strips. In Figure 4a, two copper bars 30 are positioned between each pair of mica strips 31. In Figure 4b, three copper bars 30 are positioned between each pair of mica strips 31.

An assembled ring of the bars and strips, regardless of whether such ring is formed as shown in Figure 17, or as shown in Figures 4a or 4b, is removed in clamped condition from the holder within which the ring elements were initially assembled. Such a ring is then assembled with the other elements constituting the commutator. As seen in Figure 13, there is provided a sleeve 32 having a flange or collar 33. A piece of insulative material 34 is placed about the flange 33 and a tube of insulative material 35 is placed about the sleeve 32. A separate collar 36 is utilized and this collar is provided with a strip of insulative material 37. The clamping ring within which the bars and strips are maintained is generally indicated at 38.

The sleeves 32 and associated elements 33, 34 and 35 are placed within the assembled ring as illustrated in Figure 13. The collar 36 is then placed about the free end of the sleeve 32. At this time, the clamping ring 38 may be removed and the complete assembly of elements subjected to a swaging action by which the free end of the sleeve 32 is swaged about the collar 36 as indicated at 39 in Figure 14. This completes the commutator assembly. As above stated, it is to this type of commutator assembly that the present invention is primarily directed, particular emphasis being placed on the novel mechanisms and apparatus for assembling the copper bars 30 and mica strips 31 within the retaining element 38.

General arrangement

Referring generally to Figures 1, 2, 3 and 4, the framework of the machine is shown at 40, the valve chest or hydraulic manifold at 41, and the valve operating drum at 42. What may be termed the work table is shown at 43, this being secured in a space left for it in the main framework, and having an apron 43a secured to the frame. The slotted structure for holding the gravity feed stack of mica strips is shown at 44. The two work heads which grasp the ends of the segments as they are thrust from the machine by the segment feed, which heads index around to receive additional segments, are shown at 45 and 45a. The receiving tool within which the element 38 above referred to is positioned is generally indicated at 46. The member 46 is held in a particular, adjusted position on the work table as will be described.

Figure 16:
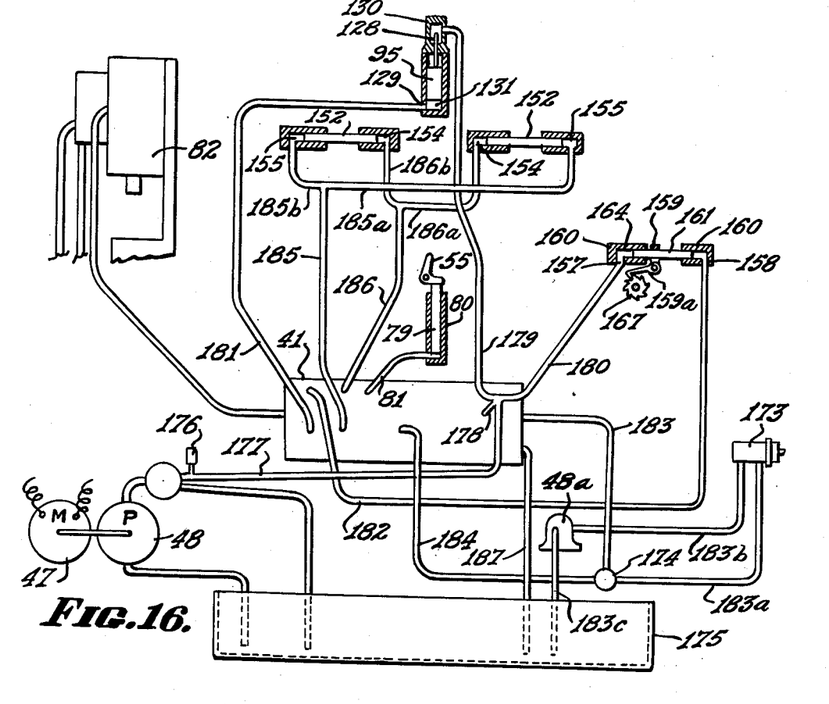
Figure 16 is an hydraulic control system for the machine.

An initial drive motor, see Figure 16, is shown at 47 and is combined with an hydraulic pump 48. A fluid motor 48a is provided to rotate the drum 42, and all of the other parts of the machine are preferably operated by hydraulic power as will be shown.

The receiving tool

Figure 6:
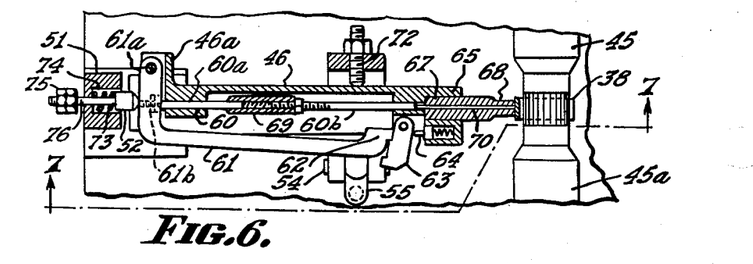
Figure 6 is a sectional view of the receiving tool taken on line 6—6 of Figure 7.
Figure 7:
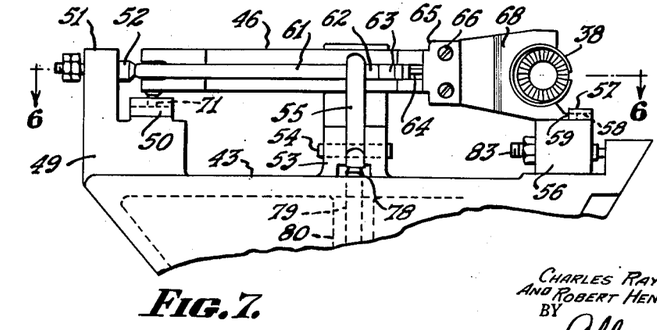
Figure 7 is a view taken on the line 7—7 of Figure 6.

The receiving tool generally is that means which houses the clamping member 38 above referred to and within which the various commutator segments are assembled so as to form a ring. This tool is best shown in Figures 6 and 7. As shown in Figure 7, there are three standards on the table 43—the standard 49, which has a slotted pad 50 on the top thereof, and an upwardly projecting post 51 carrying an adjustable abutment pin 52—the standard 53 divided into ears which support a pivot pin 54 for a bell crank 55—and the standard 56, which is equipped with an abutment plate 57, and is grooved as indicated at 58, see also Figures 4 and 17, to receive a lip 59 on the receiving tool which slides into the groove and engages that portion of the abutment plate 57 which bridges the groove.

The tool itself of which the main frame portion is indicated at 46, is constructed to provide a bearing 60a for one end of a thrust rod 60. Pivoted as at 61a in a horizontally extended slotted portion 46a of the frame adjacent this bearing is an operating bell crank lever 61, which has its short arm lying over the exposed end of the thrust rod 60. The other end of the lever is formed with a latching face as at 62. The bell crank 55 when it is rocked, as will be described, engages the lever 61 and pushes it toward the body of the frame 46 of the tool. The result is to push the thrust rod lengthwise of the tool frame. A latch 63 pivoted to the frame and which is pressed by a spring pin 64, engages the latch face 62 and has two steps formed therein. The outer step simply holds the bell crank 61 when it is not pressing on the thrust rod, whereas the inner step (as shown in Figure 6), holds the bell crank when in its position of thrusting the rod forward.

The tool frame 46 is provided with a plurality of ears 65 which project upwardly and downwardly from the end of the frame 46 and which serve to receive mounting screws 66. These screws engage the end portions 67 of a steel part 68 which houses the assembly retaining ring 38 above referred to.

The thrust rod 60 is actually made in two pieces which are connected together by a turnbuckle arrangement indicated at 69. This permits the length of the rod 60 to be adjusted for different sized commutator assemblies. The portion 60b of the rod 60 is provided with a turned down extension 70 which has a bearing in the steel part 67—68. The extension 70 of the thrust rod 60, 60b engages the resilient ring 38 which is held within the part 68. The structure of the ring 38, see especially Figure 7, is such that it is thicker at the middle, tapered toward the end, and has its end separated so that it is an incomplete annulus. The part 68 has a circular opening or jaw which houses the ring 38. This jaw is likewise an incomplete ring, and it is through the opening in these two rings or incomplete annuli that commutator segments are thrust sideways into assembly position as will be described in greater detail.

The resilient member 38 tends to remain open to its greatest extent within the jaw formed by the part 68. By pressing on the thrust rod 60, 60b the clamping member 38 is forced outwardly in the jaw, thus constricting the member 38 due to the proportioning of the parts. Thus an annular assembly of commutator segments can be set up in the clamping member 38, and then gripped by this member by operating the lever 61 which pushes the thrust rod 60, which in turn forces the ring or member 38 to constricting position.

It has been pointed out that the jaw element or part 68 is detachably mounted to the frame 46, by screws 66 extending into the ears 65. The reason for making this jaw element detachable from the frame is to accommodate different sized commutators. Due to the location of the remainder of the assembling mechanism, the center of the jaw element must be close to the center of the indexing and holding devices. Hence, a different jaw with a change in the length of the thrust rod, as can be accomplished by the turnbuckle 69, will be used for different sized assemblies.

As above described, the lower part of the jaw or member 68 has a stepped lip 59 which engages in the groove 58 and under the abutment plate 57. The inner end of the main casting of the tool has a pin 71 depending therefrom which slides in the slot in the pad 50. As so arranged, when the tool is dropped into place, it is located in crosswise relation by the pin 71 in the slot in the pad 50, and in lengthwise position by the step 57, 58 and by the engagement of the abutment pin 52 with the bell crank 61.

An abutment screw 72 serves to oppose dislodgement when the bell crank 55 is operated, see especially Figure 6.

The post 51 is provided with a bore 73 in which the pin 52 may slide. A spring 74 within the bore 73 opposes inward movement of the pin 52. The normal position of the pin 52 may be adjusted by means of the nut 75 mounted on the end of the pin extension 76. This arrangement permits the receiving tool 46 to be placed in its standards 49, 53 and 56 without undue trouble; the pin 52 will, of course, simply be depressed within the bore 73 while the lip 59 is being engaged within the groove 58.

It will be noted that the rear abutment stud or pin 52 does not directly engage the thrust rod 60. An adjustable screw 61b in the pivoted arm of the bell crank 61 engages the end of the rod 60. The stud 52 engages the bell crank, thus permitting an adjustment of the clamping action of rod 60. The reason for this construction is that when the bell crank is rocked to push forward the rod 60, the rear portion of the bell crank moves to the right (Figures 6 and 7), and as a result the whole tool can shift slightly to the left, leaving the center of the split ring 38 where it was originally. This shifting is caused by the engagement between the resilient ring and a demountable supporting block 77, to be described in greater detail further in this specification and which is shown in Figures 4 and 17. In effect, what happens is that the tool shifts to the left while the split ring retains its original center. This permits the indexing heads 45 and 45a to be retracted after the tool has been clamped.

Let us suppose that the receiving tool 46 has been dropped into position as indicated and a commutator assembly has been set up within the resilient ring 38 of the tool, with the bell crank 61 in its outer position. The machine is arranged at this juncture automatically, with the finishing of the assembly, to cause the tip 78 of a piston 79 to be pushed upwardly, with the result of clamping the work in place, with the bell crank 61 moved to its inner latched position under the influence of bell crank 55. The piston 79 is arranged in a cylinder casting 80 supported from the table portion 43, and is caused to move by oil under pressure from the passage 81, see Figure 16. The bell crank 55 is provided with a return spring (not shown) which will return the piston 79 to starting position.

Once the tool is thus clamped around the assembly, the tool can be lifted away and transferred to a press which is indicated at 82 in Figure 16 and which may be hydraulically supplied from the assembling machine. This press is used to insert the sleeve and collars above mentioned and to swage the sleeve so as to complete the assembly for machining, if necessary, and other operations as may be required or desired.

In Figure 7, there has been indicated an adjustable abutment screw 83, located in the standard 56, which may be used for adjusting the position of this standard in a groove of the table whereby the outer end of the tool when installing it in the machine for an assembling operation can be definitely located.

While the tool as described is bodily removable for further work on the assembly of commutator segment installations, it is evident that it could be adapted for use with a turret which will automatically index a receiving tool in place, and trip the latch 63 to loosen its grips on the assembly after it has been moved through a staking position as by the press 82.

The indexing and holding heads

Figure 1:
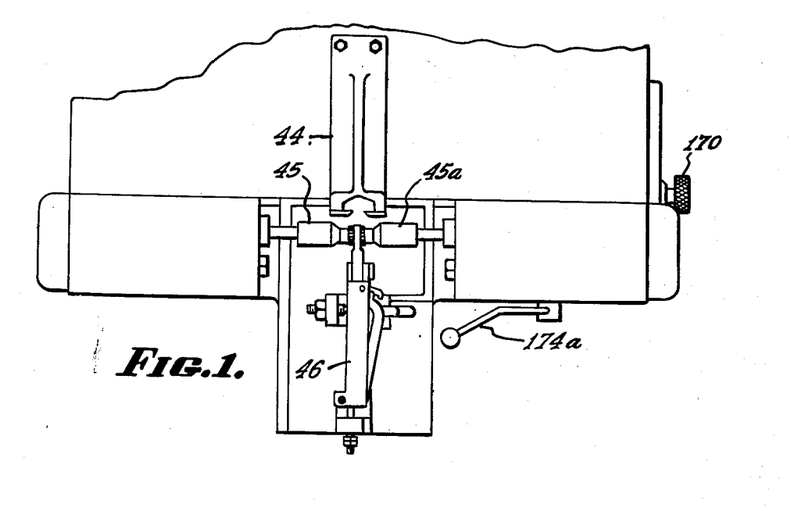
Figure 1 is a fragmentary plan view of the invention.
Figure 2:
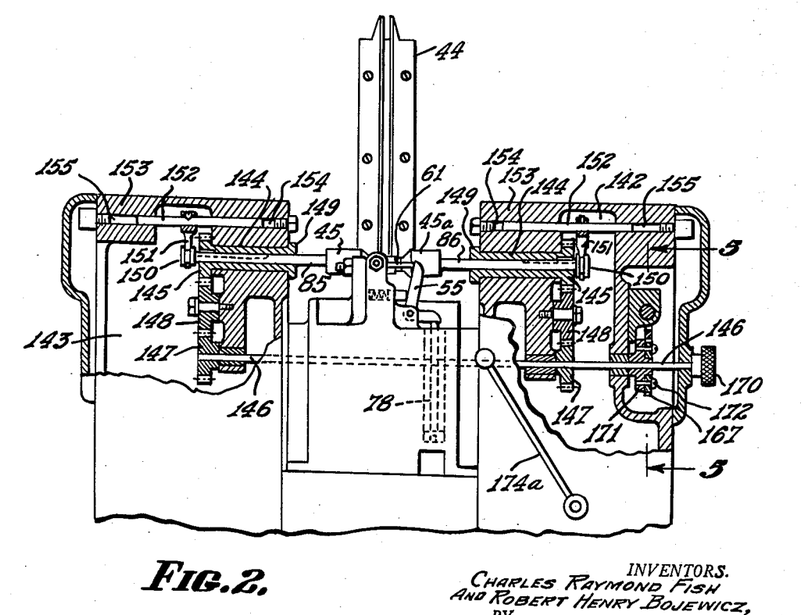
Figure 2 is front elevation of the machine with parts broken away and other parts in section.

Reference has already been made to Figures 1, 2 and 3, which show the indexing and holding heads 45, 45a. Each of these heads (see Figure 12) has a member 84, 84a mounted on the ends thereof respectively. The members 84, 84a are preferably made from pure gum rubber. The two heads 45, 45a are mounted on the ends of shafts 85 and 86 which are axially aligned. The heads are replaceable for different commutator assemblies, and set screws 87 engaging in flats 88 on the shafts will hold them demountably in place. The mica strips 31 and copper bars 30 are thrust into the grip of the rubber members 84 and 84a as is clearly shown in Figure 12. The heads 45 and 45a are rotated around step by step following each insertion. To this end, the shafts 85 and 86 are arranged to be rotated as well as reciprocated, as will be explained at greater length herein under the heading "The Indexing Mechanisms for the Indexing Heads."

As is best seen in Figure 15, the members 84 and 85 are provided with a hub 89, also formed of gum rubber. The provision of this hub takes into account the lesser width of the leading portion of the copper bars 30 as they are brought between the grip of the members 84 and 84a.

The segment ejector

As already indicated, a supply of mica pieces for insulation between the copper bars is placed in the holder 44 from which the mica pieces feed down by gravity. As best seen in Figure 17, the lowermost of these mica strips 31, will, when the nose 90 of the segment ejector is fully retracted, come to rest upon a shelf 91 provided in the machine. The nose 90 is constructed so as to permit it to pass by the shelf 91 and contact a mica strip 31 positioned thereon whereby to push same before it.

As is also seen in Figure 17, the copper bars 30 are initially introduced into the machine before the ejector nose at the position indicated by the copper bar 30 shown in Figure 17; it will be noted that the position of entrance of the copper bars is between that of the mica strips and the indexing heads.

Figure 5:
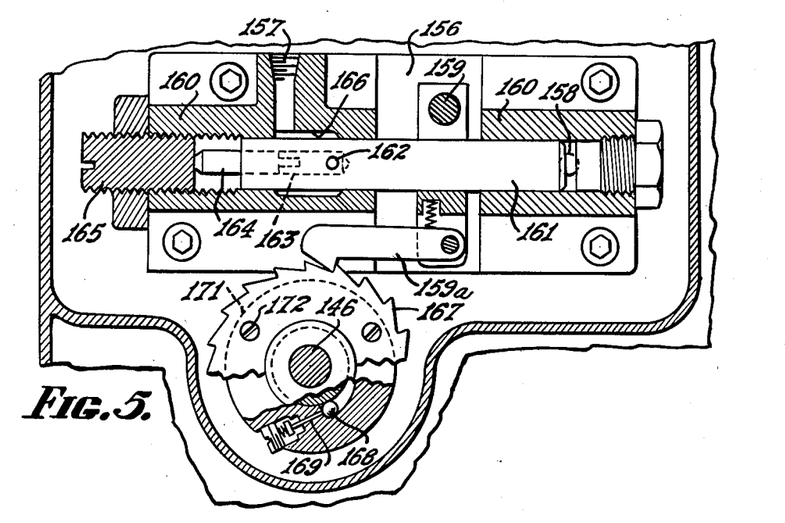
Figure 5 is an enlarged sectional view taken on the line 5—5 of Figure 2.

Mounted and guided in a channel in the frame which is closed by the projecting framework of the holder 44 is a main slide or ejector member 92; see especially Figures 4 and 17. It is to this member that the nose 90 is removably secured as indicated at 90a. The slide 92 is connected by a key 93 with a block 94 mounted on a rod or shaft 95, which is hydraulically operated, and of a detailed construction which will be described in connection with the indexing piston as shown in Figure 5; this description will be presented further on in this specifications.

The slide or ejector member rests on a member 96 fixed in the frame. The key connecting the slide 92 with the rod 95 extends through a slot 97 in the member 96.

As mentioned, the nose 90 is pinned to the slide 92 and is arranged on a line just below the center of the retaining tool jaw. The outermost end of the nose 90 is special to the particular size of commutator segments which is being used on the job at hand. Hence, the nose member 90 is changed with the job. The demountable supporting block 77 earlier mentioned underlies the advanced end portion of the nose 90 to accommodate segments of different size; this member is also changed for different jobs along with the nose 90 and the receiving tool itself. The demountable block 77 is removably secured to the member 96 on which the slide 92 reciprocates.

The upper portion of the ejector member 92, see especially Figure 17, is cut away as indicated at 98. In the extending frame portions of the member 44 there is positioned a flexible member 99. When the member 99 is depressed by action of the rod 100 at a time when the slide 92 is in its retracted position, further forward movement of the slide 92 will be prevented by engagement of the member 99 within the cut out portion 98. The rod 100 is loosely mounted within the framework of the member 44. The upper end of this rod is engaged by a cam 101 which is provided with an operating lever 102. Actuation of the lever 102 will cause the cam 101 to engage the rod 100 and thereby press the member 99.

The purpose of the means 98—101 is to make it possible for the operator to prevent reciprocation of the ejector member 92—90, while at the same time permitting the balance of the machine to continue normal sequence of action. This is a decided advantage, as will be recognized by the worker skilled in the art.

In order to prevent the ejector member 92—90 from attaining its full retracted position upon each stroke of its normal reciprocation, there is provided a spring returned, solenoid controlled gate 103. When this gate is lowered behind the slide 92 at a time when the said slide is in an advance position, full return movement of the slide is prevented. The gate is so located that when the slide 92 contacts it upon return movement, the nose 90 will still underlie the discharge end of the member 44 and thereby prevent the pickup of an additional mica strip when the slide 92 is next caused to move forward. It is the timed operation of this gate 103 which makes it possible to place a varying number of copper bars between pairs of mica strips as it is sometimes desirable to do as was earlier indicated herein. The timed operation of this gate 103 will be discussed along with the means for imparting reciprocation to the slide 92 through the rod 95.

The segment guide, pack and positioning means

A very important part of the present invention, lies in the means provided for insuring the exact positioning of the commutator segments within the confines of the resilient member 38 and between the indexing heads 45 and 45a. Such means are best shown in Figures 4 and 17 to 21.

Figure 21:
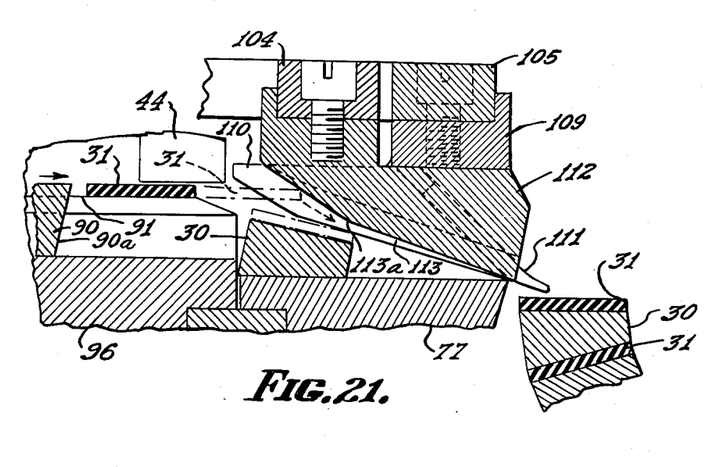
Figure 21 is a greatly enlarged fragmentary sectional view of a portion of Figure 17 showing the relation of the guide and packing means to the copper bar and mica strip.

A pair of yoke-like members 104 and 105, see especially Figures 17 and 18, are pivotally mounted as at 106 to a member 107 which may be fixed to the extended frame portion of the member 44 as indicated at 108. Fixed to the member 105, see especially Figures 19 and 21, is a guide block 109 having a pair of depending and rearwardly extending guide flanges 110. To the outer edge of each flange 110 there is fixed a needle-like member 111, having a point which extends beyond the forward edge of the block 109. The relative size of these parts is such that the distance between the pair of members 111 is a little shorter than the widest part of the commutator segments 30 and 31; thus, for example, the distance between the members 111 is less than the width of a copper bar 30 as measured between the arrows 30a of Figure 14.

A cam 112 is fixed to the member 104. The operating surface of this cam member 112 is indicated at 113. The member 112 lies between the pair of flanges 110 and extends beneath the block 109. Relative vertical movement between the members 109 and 112 is permitted by reason of the separate pivoted mountings of the members 104 and 105.

In the extended frame portion of the member 44 there is pivotally mounted a shaft 114 to which a U-shaped member 115 is fixed, see especially Figure 17. A lever 116 is also fixed to the shaft 114 and the lower end of this lever is adapted to be held in one of two positions 117 and 118 by ordinary ball and detent means. When the lever 116 is in the position shown in Figure 17 the members 104 and 105 are in their operative positions. It will be noted that there is a leaf spring 119 which is fixed to the forward end of the member 115 and which bears on the forward central portion of the members 104 and 105. Counterclockwise movement of the members 104 and 105, and the members 112 and 109 fixed thereto respectively, is resisted by this spring 119.

When it is desired to render the members 104 and 105 inoperative, the lever 116 is moved by the operator until the lower end thereof is engaged by the detent 118. Such movement causes a strap 120 fixed to the member 115 as at 121 to engage beneath the members 104 and 105 and lift same, along with the spring 119, away from the demountable support block 77 of Figure 17. This enables an operator to get at the mica strip and copper bar channels in case there should be a jam up of some kind.

The operation of the guide and pack means just described, is perhaps best shown in Figure 21. In this figure, it will be noted that the nose 90 of the slide 92 is in its retracted position. A mica strip 31 rests upon the shelf 91. The forward portion of the member 44 is also shown. The true shape of the holder 44 is shown by the cross section of Figure 20. Referring again to Figure 21, it will be observed that a copper bar 30 has been brought into position on the block 77. The guide member 109—110 and the cam 112 are in the position they would assume when the lever 116 is in the position indicated in Figure 17. The tips of the members 111 will actually extend to a position between the members 84 and 84a of the indexing heads 45 and 45a respectively. Upon initial forward movement of the nose 90 a mica strip 31 resting on the shelf 91 will be engaged. As forward movement of the nose 90 continues, the mica strip will be moved to the horizontal dotted line position indicated in Figure 21 wherein the leading edge of the strip 31 will engage between the flanges 110 and will contact the cam surface 113 of the cam 112. It should be noted at this time, that although the flange members 110 are so located as to be a distance less apart than that indicated between the arrows 30a of the Figure 14 as above described, they are sufficiently far apart to permit the leading narrower portion of the segments 30 and 31 to engage therebetween. Thus, considering Figure 20 and a mica strip there shown, it should be noted that the portion of the strip indicated between the arrows 31b is small enough to engage between the flanges 110 while the portion of the strip between the arrows 31a is too large to engage between the flanges 110 and, in fact, will underlie these flanges.

Upon still further forward movement of the member 90, the mica strips will be moved from the dotted horizontal position of Figure 21 to a position wherein it lies on top of a copper bar 30. To aid this result, it should be observed that the cam surface 113 becomes less steep at 113a, this latter point overlying the forward edge of the copper bar 30. Upon continued forward movement of the member 90, both the segment 31 and the segment 30 will be engaged by the slanted face 90a of this nose member.

As the segments 30 and 31 are moved together by continued movement of the member 92—90 increasing resistance of the spring 119 will be encountered by reason of the shape of the cam 112. When the segments 30 and 31 are finally pushed from beneath the cam 112 and the flanges 110 (the rear edges of the segments 30 and 31 lying beneath the flanges 110 and not therebetween) to a position between the rubber members 84 and 84a of the indexing heads, they will be pushed to a position beneath the center of the ring-shaped member 38 by reason of the members 111 which will bear on the rear portion of the mica strips 31 and copper bar therebeneath.

The guide and packing means just described insures that the copper bars and mica strips will be so placed between the indexing heads that the next segments to be assembled will have adequate room to enter between the heads when forced off of the block 77 by the slide member 92—90. The spring pressed members 111 will insure that the segments already asesmbled within the ring are positioned just below the top surface of the block 77; see especially Figure 21.

In some instances, it may be desired to supplement the packing action obtained by the spring 119 through the yokes 104 and 105 and the guide and cam members carried thereby. To this end, there is provided a spring actuated rod 122 located in an extension 123 of the frame portion of the member 44. The rod 122 has a lateral extending portion 124 which normally rests on the upper portion of the extension 123. This extension, however, is provided with a slot 125, and when the operator so moves the lateral extension 124 that it is free to ride in the slot 125, the spring 126 located between a pin 127 on the rod 122 and the bottom of the extension 123 will serve to depress the rod 122. This rod will come to bear on the member 105 just above the point at which the block 109 with the guide flanges 110 is fixed thereto. In this manner, further packing action is provided.

As above indicated, should it be desired to gain access to the discharge end of the holder for the mica strips and of the channel through which the copper bars are brought into position before the nose 90, the operator need only return the rod 122 to the position shown in Figure 17 and move the lever 116 to its other position as indicated at 118. This latter movement will result in the yoke members 104 and 105 being pivoted in a counterclockwise direction with the result that the members 109 and 112 will be lifted clear of the block 77.

*Segment ejector slide actuating means*

In Figure 4, it will be seen that the rod 95 is provided with a small diameter end portion 128 which forms an internal piston and which is subject to constant hydraulic pressure in a cylinder 130 at the left in this figure. A full diameter portion of the right end of the rod 95 is subjected to intermittent hydraulic pressure in a cylinder 131 through the port 129, which pressure can overcome, due to the larger area of the rod itself, the pressure on the internal piston portion 128, thus pushing the rod 95 to the left. The port 129 and cylinder 131 are best seen in Figure 17. Referring again to Figure 4, it will be observed that the rod 95 is exposed between the cylinder 130 towards the rear of the frame and the cylinder portion 131 toward the front of the frame, and it is on the intervening portion that the block 94 is mounted. It is through this block, of course, that the rod 95 is connected to the segment ejector slide 92 as above described. The actual means for supplying the constant pressure to the cylinder 130 and the intermittent pressure to the cylinder 131 will be described in connection with the hydraulic system as a whole.

Again, as best seen in Figure 17, it will be noted that there has been provided a set screw 132 by means of which very fine adjustment can be obtained in the forward stroke of the rod 95, and, of course, the segment ejector slide 92 actuated thereby.

Briefly, the operation of the segment ejector slide actuating means is as follows. In time with the indexing device to be described below, and operating when it comes to rest after each step of movement, oil under pressure is injected into the port 129. This causes the rod 95 to move to the left (Figure 4); and then with the release of hydraulic pressure at the port 129, the constant pressure on the internal piston element 128 through the cylinder 130 pushes the slide 92 (through the rod 95, block 94, and key 93) forward over the special shelf or demountable block 77, and ejects a copper segment which has been fed to position parallel with the table along with the mica piece which rests upon it after descending from the holder 44. The result is to thrust the pair of pieces into the open jaw of the receiving tool 46, and into the grip of the indexing heads 45 and 45a.

As above indicated, it is sometimes desirable to prevent the slide 92 from obtaining its furthermost left hand position as viewed in Figure 4. To this end, a spring-returned, solenoid-controlled gate 103 has been provided. This gate is normally held in the position indicated in Figure 4 by the spring 132. The solenoid itself is generally indicated at 133 and is provided with a pair of leads 134 which are connected to a switch shown at 135 in Figure 3. In Figure 3, there is also shown a cam wheel 136 which rotates with the drum 42. A cam follower 137 is located in an extension 138 of the frame and is urged into contact with the cam 136 by a spring 139.

It will be understood that the cam surface of the member 136 is such that periodically the follower 137 will be forced upwardly against the spring 139. When this happens, the actuator 140, which is fixed to the follower 137 and slidable within the extension 138, will contact the switch button 141 and thereby cause actuation of the solenoid valve 133 of Figure 4. When so actuated, the valve 133 will cause the gate 103 to be pulled down against the resistance of spring 132 into a position behind the slide 92, thereby preventing its full return movement with the attending results as above fully described. By changing the nature of the cam surface of the cam 136, there may be, of course, variations effected in the reciprocable movement of the slide 92 as desired.

*The indexing mechanisms for the indexing heads*

The object of the indexing mechanism is to rotate the members 45 and 45a around step-by-step and withdraw or push them to operative position in time with the other operations of the machine. Such mechanism is best shown in Figures 2 and 5.

The two shafts 85 and 86 to which the heads 45 and 45a respectively are fastened, enter the gear cases 142 and 143 respectively and are there keyed and fitted to slide within sleeves 144, which have pinions 145 at their outer ends. The shaft 146 is mounted in the two gear cases and extends across between them, which shaft is rotated step-by-step. By means of pinions 147 and 148, the shaft engages the sleeve pinions and causes the two shafts 85 and 86 to rotate in the same direction, which in this case is counterclockwise, but without impeding the reciprocation of the shaft.

It is also necessary to move the shafts 85 and 86 in and out within the sleeves which are held against sliding by means of their being provided with thrust nuts 149 at their inner ends opposing the pinions 145 at their outer ends. These shafts are equipped with channeled rings 150 engaged each by a lug 151 mounted on a reciprocating piston rod 152, one for each shaft 85 and 86. The movement of the piston rod thus slides the shaft in and out of operating position. The operation of the piston rods 152 which hold the lug 151 is alike in both instances. There are two spaced cylinders 153 for each rod 152, with ports 154 and 155 at opposite ends. The piston rods themselves are actuated simultaneously first by pressure applied at one end of each piston 152 in the cylinder 153, then by pressure applied at the other end of each piston 152 in the cylinders 153.

For operating the indexing shaft 146, a device is supplied of the type already referred to for operating the segment pusher or slide 92. A casting 156, see Figure 5, embodying spaced cylinders is mounted within the gear case. One of the cylinders has a port 157 therein and the other a port 158 therein. The pawl carrier 159 is mounted on the piston rod in between the cylinder portions 160. The piston rod 161 has a port 162 therein and is cored out to form a piston cylinder 163 into which cylinder oil will flow through the port 162. Within the cylinder 163 is a piston 164, which acts against an adjustable abutment plug 165 in the end of the main cylindrical casting. Oil from the port 157 as permitted by the annular groove 166 enters the inner cylinder and pushes the small piston 164, thus causing the main piston rod to move in the opposite direction. The port 157 is supplied with oil under constant pressure, and thus serves as a sort of hydraulic spring. The other end of the piston is acted on by hydraulic pressure entering the port 158, and since the main piston rod is of much larger diameter than the smaller piston 164, the same pressure of oil, will, when it flows through the port 158, cause the main piston to overcome the effect of the small piston and move the main piston against the constant pressure on the small piston. As a result, a momentary impulse of hydraulic pressure, immediately relaxed through the port 158, will cause a complete reciprocation of the main piston rod 161, and move the pawl carrier to and fro, the length of movement being gauged by the position of the abutment 165.

Mounted on the shaft 146 is a ratchet pinion 167, held against motion in one direction by means of a ball 168 and spring pin 169, the ball riding in a cam groove in the bore of the pinion. The pawl 159a when it moves with the momentary impulse from the hydraulic control, passes over the ratchet pinion and on the return stroke under the constant pressure impulse, moves the ratchet pinion one notch.

The shaft 146 extends out through the side of the left hand gear case, and is equipped with an operating knob 170, see Figure 2. By this means, heads 45 and 45a can be operated by hand should it at any time be desired to bring these heads to a particular position for the start of an operation on a given assembling job.

When shifting the number of strokes of the indexing operation for various numbers of commutator segments per assembly, the ratchet pinion 167 is changed so that for a given single movement of the ratchet pinions 147 a different step of movement is applied to the two heads 45 and 45a. Thus, it takes a different number of ratchet movements to complete an assembly. Also, the ratchet pawl carrier is adjustable for stroke by adjustment of the abutment 165. A simple way of demountably securing the ratchet pinion 167 is to equip the shaft 146 with a fixed collar 171 and hold the pinion in place thereon by means of screws 172, see Figures 2 and 5.

*The hydraulic system and associated means for complete operation of the machine*

Referring first to the control diagram of Figure 16, wherein it will be noted that many of the mechanisms above discussed are set forth rather diagrammatically, the motor 47 is shown with the hydraulic pump 48. The fluid motor 48a is shown, which operates the rotating drum 42, not shown on this diagram. A speed control indicated at 173, which controls the speed of the drum 42, and a start valve 174, which supplies initial hydraulic power to the drum, are shown. This last mentioned valve has a handle 174a, which is shown in Figure 2. As soon as the drum ceases to revolve, all parts of the machine stop having completed a cycle wherein the ring 38 has been completely filled with commutator segments. There is an oil sump 175, and a pressure controlling and relief valve 176 in the line from the hydraulic pump. The direct pressure from the relief valve flows through pipe 177 to a branch connection from which a pipe 178 enters the valve chest or hydraulic manifold 41, and pipes 180 extend to the segment pusher internal piston 128 (see also Figure 4), and to the rachet drive internal piston 164 through port 157 (see also Figure 5).

In the diagram of Figure 16, it is to be understood that where there are two pipes emerging from the valve chest 41, one above the other, the two parts are controlled by one valve assembly; where there is but one pipe then the valve only operates from the valve chest in one direction. The pipe 181 extends to the full diameter end of the piston 95, and the pipe 182 extends to the full diameter end of the piston 161 through the port 158. It will be noted that one valve assembly applies pressure intermittently to the pipes 181 and 182, thus obtaining interspaced operation of the idle operation of the pusher and the idle pawl and ratchet operation of the indexing drive shaft 146, which will be followed by the constant pressure positive operation of these two devices in interspaced timing.

The pipe 183 extends from the constant pressure in the valve chest to the starting valve 174 from which pipes 183a and 183b extend to the drum motor 48a whence pipe 183c extends to the sump 175. The pipe 184 extends from the valve chest to the starting valve, and normally supplies the hydraulic fluid through valve 174 to the drum motor. This control valve 174 may be of any type, such as are available on the market as two-way valves. When the pipe 184 is connected through the valve to pipe 183a, the pipe 183 is shut off. With the machine at rest, the valve drum motor may be started by operating valve 174 to supply fluid to the motor 48a through pipe 183 until the valve drum has opened the valve connected to pipe 184. Then if the valve 174 is thrown in the opposite direction, the motor will continue to run with fluid supplied through pipe 184 until the valve on the valve chest automatically stops the motor by cutting off pipe 184.

The push toward operating position of the heads 45 and 45a is accomplished through pipe 185 having branches 185a and 185b, and the push away from operating position of the two heads is accomplished through pipe 186; controlled through the other end of the same valve through its branches 186a and 186b. The piston 79 which clamps the retaining tools is operated through pipe 81 as previously described. Pipe 81 is not coupled with a double acting valve. There is an exhaust passage from the valve chest to the oil sump through pipe 187.

Referring now to the drum 42 (see Figure 3), it will be noted that it has a series of channels 42a therein, and in the channels may be located abutment pieces 42b, which may be shifted from place to place, and secured by screws 42c in rows of holes 42d extending along the boundary walls of the channels. A toothed ring 188 is demountably secured at the one end of the drum and serves to operate the indexing piston and ratchet and the segment pusher. A simple way to make this member 188 demountable is to make it in two halves with screws 189 to enter the holes provided in the drum for that purpose. The drum rotates once for each operation from start to stop.

Figure 9:
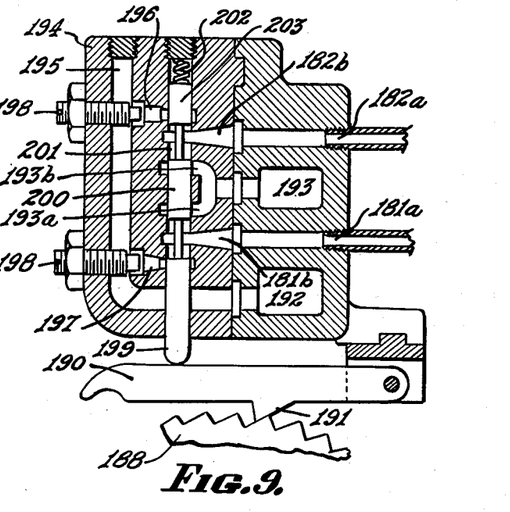
Figure 9 is a section taken on the line 9—9 of Figure 8.

There are two types of valves used in the valve chest. To operate the valves a series of trip fingers 190 are pivoted on the valve chest casting, and extend rearwardly under the projecting end of the spring plungers of the several valves. The fingers have a tapered tooth 191 (see Figure 9) on their underside which rides on the drum and is engaged by the adjusted abutment members 42b on the drum, there being one of these fingers that rides on the toothed ring 188.

Figure 8:
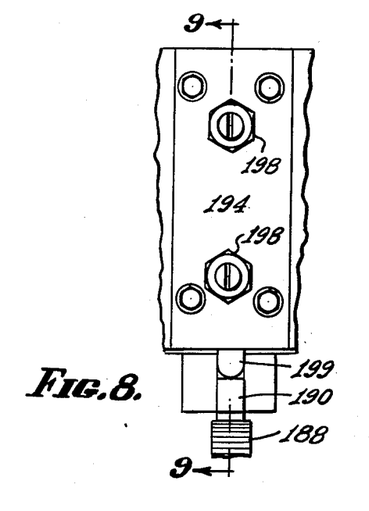
Figure 8 is a front elevation of one of the valve members.

Referring first to the valve device of the character used for the two members which are operated by the constant pressure applied to an internal piston to-wit, the segment pusher and the piston for the indexing ratchet drive (Figures 8 and 9), such mechanism will be described as follows. In the valve chest there is a passage 181a for connecting up to the pipes 181 to the pusher, and a passage 182a leading to the pipe 182 for the ratchet drive. There is also an exhaust passage extending the full length of the chest as indicated at 192 and a full pressure passage extending the length of the chest indicated at 193. Mounted on the face of the chest to register with the several passages now noted, is a valve casing 194, which has an exhaust passage 195, and exhaust ports 196 and 197 entering this exhaust passage, which connects up with the exhaust passage in the chest, and thence to the oil sump. Adjustment of the operation of the valve is through screw plugs 198 which enter the exhaust ports 196 and 197. The valve piston projects from the casing at 199. An opposite end portion controls the exhaust through port 196. There is also a full cylindrical portion 200 which controls alternately the two ports 193a and 193b which communicates with the full pressure passage 193. There are ports 181b and 182b connecting with the two passages 181a and 182a respectively, these ports extending into the piston chamber 201. A spring 202 keeps the valve piston in engagement with the trip finger 190. The full cylindrical portion 200 alternately sends pressure through the passages 181b and 182b. Another full cylindrical portion 203 connects port 182b to the exhaust when the piston moves to shut off the positive pressure from said port. Thus, when the piston of this valve is pushed in by the trip finger, the segment feed is caused to operate, and when the piston returns under spring pressure the index ratchet is operated.

Figure 10:
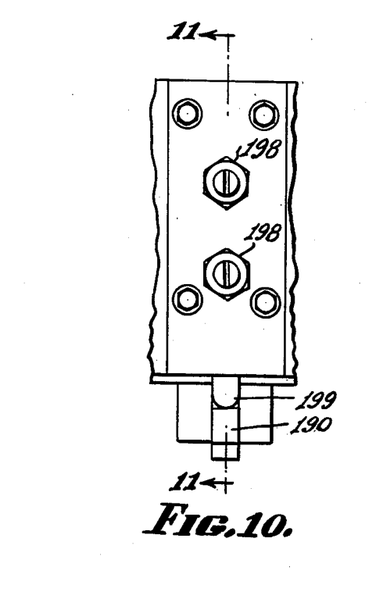
Figure 10 is a front elevation of another valve.

Referring to the other valves (see Figures 10 and 11) it has already been noted that all are of the same construction and where there is no double action involved, one side of the valve is simply plugged. The parts which are the same in these other valves are marked with like numbers to those of the valve and casing already described. The difference lies in the pistons, and ducts which control pressure admission to the two outlet ports to the devices to be operated.

Thus, the full pressure passage 193 in the valve chest has a single port 204 which is extended in the valve casing into the piston cylinder thereof, and two short full cylindrical portions 205 and 206 admit this pressure alternately to the two outlet ports, which as an illustration are ports 185c and 186c leading to the chest ports 185d and 186d. The port 185d is connected to the pipe 185 and its branches 185a and 185b. The port 186d is connected to the pipe 186 and its branches 186a and 186b. This valve structure will operate the two pistons 152 of the index head reciprocating devices, first in one direction and then in the other.

Figure 11:
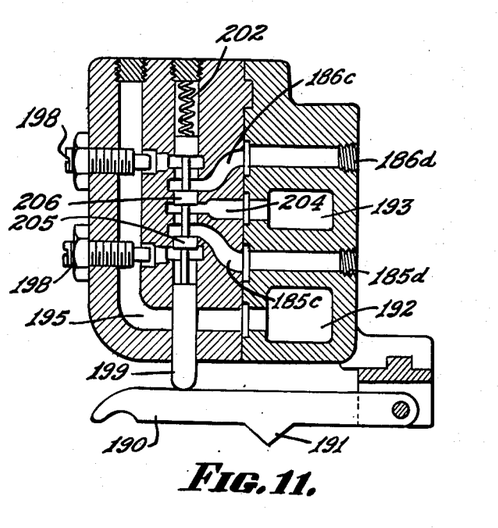
Figure 11 is a section taken on the line 11—11 of Figure 10.

Thus in Figure 11, when the valve piston is in the position shown, the exhaust is connected to pipe 186 (its branches) through ports 186c and 186d and pressure is admitted to pipe 185 (its branches a and b) through ports 185c and 185d, the two piston rods 152 are then pushed inwardly to their regular position of operation. When the valve is pushed up by the trip finger, however, the pressure is cut off from the port 185d which is then connected with the exhaust and the pressure passes through ports 186c and 186d, thus withdrawing the heads from operation. Since the machine stops at this instant, and the drum pauses with the two heads withdrawn, it requires a starting up of the mechanism in order to cause the valve piston to drop and the two heads to move in again. Pipes 81 and 184 are supplied with pressure or connected with exhaust by using but one of the outlet ports of the valves of the type described. In such a case, a plug is inserted into the passages which are marked 185c or 186c in Figure 11.

A valve of the type last described is not so quick acting as the first described type. One of the second type is used to stop the drum motor, as already noted, through pipe 184; and since the drum stops with the valve rod 199 elevated, as soon as the drum starts out through the operation of the valve 174 the piston 199 of the drum controlled valve will fall, and take over the oil supply to the drum motor.

Operation in general

Since the operation of the several mechanisms have been detailed during the foregoing description, a further detailed description of operation of the complete machine will not be set forth save to state that in the structure shown the retaining tool will first be installed, after the machine has been set up for a given operation, and the starting lever then swung over to release the drum for operation.

The drum having been started, those devices which were operated at the conclusion of the previous operations, such as the withdrawing plungers for the two heads 45 and 45a which were the last things to move, will come into operation. The location of the stops on the drum control the relative timing of the various devices described.

When the rods 152 are actuated by the hydraulic relationship set up within the ends 154 and 155 of the valves 153 (see Figures 2 and 16), the shafts 85 and 86 will be so moved as to bring the heads 45 and 45a into position alongside the clamping rings 38. As the shafts 85 and 86 are rotated in step-by-step fashion through the members 146, 147 and 148, the segment ejector slide 90, 92 is caused to reciprocate in timed relation therewith through the valve controlled member 95 which operates under the influence of pressure within the pipes 181 and 179. Insofar as concerns this feed and the indexing rotation of the two heads, this is positively prevented from getting out of time because the same valve plunger operates both control members.

By a change of ratchets for the indexing drive shaft, and substituting a new toothed member 188 on the control drum, a different number of rotating steps for the two indexing and retaining heads is provided for. By changing the indexing heads, the retaining ring 38, the jaw member 68 and the block 77, different sized segments and assemblies are provided for, this requiring also a changing of the pusher member 90. By shifting the timing lugs on the drum, the point of operation of the several valves is adjusted to proper relative timing. In order to regulate the number of copper bars desired between pairs of mica strips, one need only change the member 136 so as to cause the gate 103 to be actuated and thus prevent full return of the segment pusher 92, 90.

In the machine as indicated in the diagram, it requires a hand operation to operate the staking press, but this could be coupled up with the valve chest and drum, if there were a turret operation for the retaining tool, this turret operation also being controlled from the drum and valve chest.

It is to be understood that modifications may be made to this invention without departing from the scope and spirit thereof, and although the invention has been described as embodying particular structure it is to be understood that the invention is not limited to this specific arrangement of structures. The invention having been thus described, what is claimed as new and what is desired to be protected by Letters Patent is:

1. In apparatus for assembling commutators composed of copper bars and mica strips, a pair of rotatable heads to receive copper bars and mica strips therebetween, means to rotate said heads step by step, an ejector slidable towards and away from said heads along a path extending between said heads, means to reciprocate said ejector between a full forward position and a full return position in timed relation to the step by step movement of said heads, a shelf located in the path of said ejector in advance of said heads, means to position a mica strip on said shelf when said ejector is in its full return position, a support located in the path of said ejector at a lower level than said shelf and between said shelf and said heads, means to position a copper bar on said support when said ejector has been moved from its full forward position, said shelf and support being so located that on movement of said ejector towards said heads the mica strip will be contacted by said ejector before the copper bar is contacted by said ejector, said shelf supporting the mica strip above said support so that the mica strip will be pushed from said shelf onto the top of the copper bar as the ejector is moved towards said heads, full forward movement of said ejector serving to insert the strip and bar between said heads, an abutment normally removed from the path of said ejector and movable to a position in said path behind said ejector when in its forward position to prevent said ejector from reaching its full return position, and means to move said abutment into the path of said ejector and therebehind in timed relation to the step by step movement of said heads, a portion at least of said ejector underlying said shelf when said ejector contacts said abutment so as to thereby periodically prevent a mica strip from being positioned on said shelf ahead of said ejector, said ejector on its next forward movement away from said abutment moving beneath the mica strip and contacting only a copper bar, whereby the number of mica strips to copper bars inserted between said heads by said ejector can be varied in accordance with the timed relationship between said last mentioned means and said heads.

2. The apparatus of claim 1 in which said abutment comprises a gate, and a resilient member normally maintaining said gate out of the path of said ejector, said last mentioned means moving said gate against the action of said resilient member.

3. The apparatus of claim 1 including an additional abutment normally removed from said ejector, and means to move said additional abutment into engagement with said ejector to prevent said ejector from leaving its full return position while said heads are continued to be rotated step by step.

4. The apparatus of claim 1 in which said ejector is a two piece ejector, said two pieces consisting of a main portion and a removable tip adapted to contact the said strips and bars.

5. The apparatus of claim 1 including adjustable means to limit forward movement of said ejector according to the size commutator being assembled.

6. The apparatus of claim 1 including means for guiding and packing said strips and bars as pushed between said heads by said ejector.

7. The apparatus of claim 6 in which said guide and pack means comprises a pair of pivotally mounted yoke-like members, a guide block secured to one of said pair of members, said block having a pair of flanges, a cam fixed to the other of said pair of members, said cam lying between said flanges and beneath said block, said pair of members supporting said block and cam in the path of said ejector adjacent said heads and arranged so that a portion of the strip and bar moved by said ejector contacts said cam between said flanges, said cam having a surface directing said strip and bar downwardly between said heads into contact with those strips and bars previously positioned.

8. The apparatus of claim 7 including spring means urging said pair of members about their pivots in the direction of said heads.

9. The apparatus of claim 8 in which a needle-like prong extends from each flange to a position between the said heads.

10. The apparatus of claim 9 in which said cam lies between said shelf and said heads and above said support, forward movement of said ejector pushing a strip into contact with said cam, further forward movement of said ejector pushing said strip as guided by said cam onto said bar, still further forward movement of said ejector pushing said strip and bar from said platform between said heads in opposition to said spring urged means, whereby said strip and bar are packed firmly within said heads.

11. The apparatus of claim 10 including additional spring urged means selective to offer further opposition to the ejection of said strip and bar.

12. The apparatus of claim 10 including a support member pivotally mounted in said apparatus, said support member including means underlying said pair of yoke members intermediate their pivotal mounting and the cam and block carried thereby, and means to rotate said support member about its pivot whereby said block and cam are raised out of the path of said ejector.

13. The apparatus of claim 12 in which said spring means comprises a leaf spring mounted on said support member and bearing against the forward portion of one of said yoke members.

References Cited in the file of this patent

UNITED STATES PATENTS

| Number | Name | Date |
|---|---|---|
| 1,493,480 | De Tour | May 13, 1924 |
| 2,394,955 | Weber | Feb. 12, 1946 |
| 2,494,349 | Mittermaier | Jan. 10, 1950 |
| 2,585,792 | Kroener | Feb. 12, 1952 |